(12) United States Patent
Jing et al.

(10) Patent No.: US 10,851,240 B2
(45) Date of Patent: Dec. 1, 2020

(54) COMPOSITIONS, METHOD OF MAKING AN ARTICLE, AND ARTICLES

(71) Applicant: 3M INNOVATIVE PROPERTIES COMPANY, St. Paul, MN (US)

(72) Inventors: Naiyong Jing, St. Paul, MN (US); Kevin D. Landgrebe, Woodbury, MN (US); Ryan T. Woldt, Minneapolis, MN (US); Wensheng Xia, Woodbury, MN (US); Timothy J. Nies, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 58 days.

(21) Appl. No.: 16/097,990

(22) PCT Filed: Apr. 25, 2017

(86) PCT No.: PCT/US2017/029382
§ 371 (c)(1),
(2) Date: Oct. 31, 2018

(87) PCT Pub. No.: WO2017/192306
PCT Pub. Date: Nov. 9, 2017

(65) Prior Publication Data
US 2019/0144670 A1    May 16, 2019

Related U.S. Application Data

(60) Provisional application No. 62/332,255, filed on May 5, 2016.

(51) Int. Cl.
| | |
|---|---|
| *C08L 79/02* | (2006.01) |
| *C09D 179/02* | (2006.01) |
| *C08G 73/02* | (2006.01) |
| *C08L 33/08* | (2006.01) |

(52) U.S. Cl.
CPC .......... *C08L 79/02* (2013.01); *C08G 73/0206* (2013.01); *C08G 73/0246* (2013.01); *C08L 33/08* (2013.01); *C09D 179/02* (2013.01); *C08L 2201/54* (2013.01); *C08L 2203/16* (2013.01)

(58) Field of Classification Search
CPC ...... C08L 79/02; C08L 33/08; C08L 2201/54; C08G 73/0246
See application file for complete search history.

(56) References Cited

U.S. PATENT DOCUMENTS

| | | | |
|---|---|---|---|
| 8,597,959 B2 | 12/2013 | Jing | |
| 2008/0248317 A1* | 10/2008 | Tsuchida | ................. C23C 22/60 |
| | | | 428/447 |
| 2012/0009396 A1 | 1/2012 | Sikka | |
| 2014/0370306 A1 | 12/2014 | Park | |

FOREIGN PATENT DOCUMENTS

| | | |
|---|---|---|
| CN | 1411486 A | 1/2005 |
| EP | 2139812 A1 | 1/2010 |
| EP | 2366669 | 9/2011 |
| JP | 2001-049171 | 2/2001 |
| JP | 2001049171 * | 2/2001 |
| WO | WO 01/29118 A1 | 4/2001 |
| WO | WO 2008/130766 A1 | 10/2008 |

OTHER PUBLICATIONS

JP 2001 049171 machine translation (2001).*
Gelest, "Trimethoxysilylpropyl Modified (Polyethylenimine). 50% in Isopropanol", Safety Data Sheet SSP-060, Version 10, Issued on Jan. 13, 2015, 8 pages.
Nguyen, Nitric Oxide Release from Polydimethylsiloxane-Based Polyurethanes, Journal of Applied Biomaterials & Functional Materials, Sep. 2014, vol. 12, No. 3, pp. 172-182.
Ribeiro, "Silica Grafted Polyethylemmine As Heterogeneous Catalyst for Condensation Reactions", Applied Catalysis A: General, Apr. 2011, vol. 399, No. 1-2, pp. 126-133.
International Search Report for PCT International Application No. PCT/US2017/029382, dated Jul. 25, 2017, 5 pages.

* cited by examiner

*Primary Examiner* — Kuo Liang Peng
(74) *Attorney, Agent, or Firm* — Bradford B. Wright

(57) ABSTRACT

Compositions include a compound preparable by reaction of components comprising an optionally crosslinked polyethylenimine and at least one an amine-reactive hydrolyzable organosilane represented by the formula R—Z—SiY$_3$. R represents an amine-reactive group containing 1 to 18 carbon atoms; Z represents a divalent organic group containing 1 to 8 carbon atoms; and each Y independently represents a hydrolyzable group. Methods of using the compositions to make articles, and articles produces thereby are also disclosed. A composition comprising an intimate mixture of a crosslinked polyethylenimine and a polymeric binder material, and a method of making it is also disclosed.

8 Claims, 1 Drawing Sheet

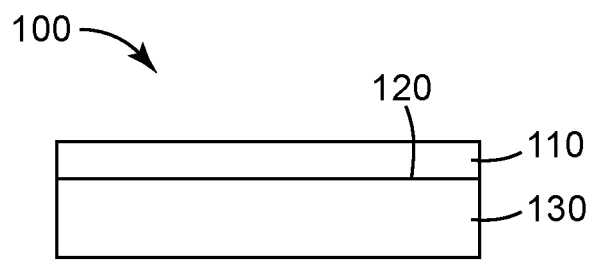

COMPOSITIONS, METHOD OF MAKING AN ARTICLE, AND ARTICLES

TECHNICAL FIELD

The present disclosure broadly relates to compositions, especially curable compositions, methods of making articles using the compositions, and articles produced thereby.

BACKGROUND

Polyethylenimine (PEI) is commercially available in several forms such as linear, branched, and dendrimeric.

PEI is available in several forms such as linear, branched, and dendrimeric. Linear PEI can be represented by Formula I, below:

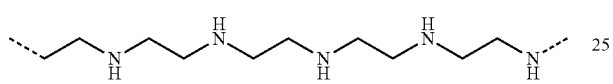

(I)

wherein --- indicates continued linear polymeric ethylenimine-derived units or H. Linear PEI is available by post-modification of other polymers like poly(2-oxazolines) or N-substituted polyaziridines. Linear PEIs are commercially available and/or can be made according to known methods.

An exemplary branched PEI fragment can be represented by Formula II, below:

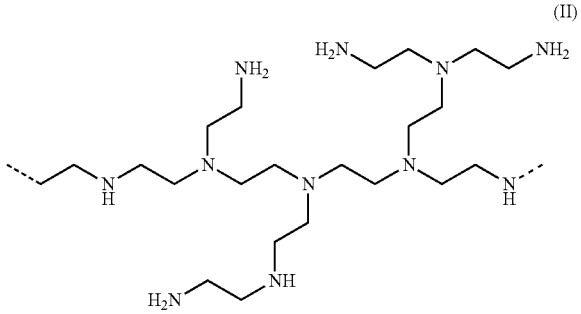

(II)

wherein --- indicates continued linear and/or branched polymeric ethylenimine-derived units or H. As branching is typically more or less random, branched PEIs typically contain many compounds of this general type as a mixture. Branched PEI can be synthesized by the ring opening polymerization of aziridine. Branched PEIs are commercially available and/or can be made according to known methods.

Dendrimeric PEI is a special case of a branched PEI. An exemplary (generation 4) dendrimeric PEI is represented by Formula III, below:

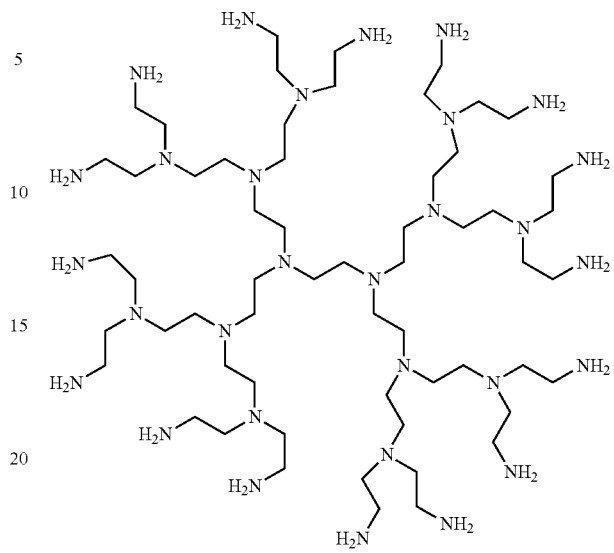

(III)

In this case, the PEI contains only primary and tertiary amino groups. Dendrimeric PEIs are commercially available and/or can be made according to known methods.

As used herein, the term "polyethylenimine" also includes protonated forms.

PEI can be covalently crosslinked (i.e., at least partially cured) by combining it with a polyfunctional (e.g., difunctional) crosslinking agent such as, for example, hexanediol diacrylate (HDDA). The HDDA reacts with a primary amino group by Michael addition at each acrylate group. However, reactions with such crosslinkers are typically too fast to permit their use in a one-part curable composition.

It would be desirable to provide a reasonably stable one-part curable PEI-derived composition that can be applied to a substrate and cured.

SUMMARY

The present disclosure provides reasonably stable one-part curable PEI-derived compositions that can be applied to a substrate and cured to provide durable amine-functional coatings on the substrates. The coatings may be useful, for example, in chemical monitors (e.g., for monitoring exposure to an aldehydic disinfectant), and/or for modifying the hydrophilicity of and/or protecting a surface of a substrate.

In one aspect, the present disclosure provides a composition comprising a compound preparable by reaction of components comprising a polyethylenimine and at least one an amine-reactive hydrolyzable organosilane represented by the formula:

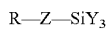

wherein:
R represents an amine-reactive group containing 1 to 18 carbon atoms;
Z represents a divalent organic group containing 1 to 8 carbon atoms; and
each Y independently represents a hydrolyzable group.

In another aspect, the present disclosure provides a composition comprising compound preparable by reaction of components comprising a crosslinked polyethylenimine and at least one an amine-reactive hydrolyzable organosilane represented by the formula:

wherein:
R represents an amine-reactive group containing 1 to 18 carbon atoms;
Z represents a divalent organic group containing 1 to 8 carbon atoms; and
each Y independently represents a hydrolyzable group.

In another aspect, the present disclosure provides a method of making an article, the method comprising:
coating at least a portion of a surface of a substrate with a composition according to the present disclosure disposed thereon; and
hydrolyzing at least some of the hydrolyzable groups Y.

In another aspect, the present disclosure provides an article comprising:
a substrate having a surface; and
a reaction product of a composition according to the present disclosure at least a portion of the surface of the substrate.

In another aspect, the present disclosure provides an article comprising:
a substrate having a surface; and
a crosslinked reaction product of a composition according to the present disclosure disposed on at least a portion of the surface.

In yet another aspect, the present disclosure provides a composition comprising an intimate mixture of a crosslinked polyethylenimine and a polymeric binder material.

In yet another aspect, the present disclosure provides a method of making a composition, the method comprising sequentially intimately mixing:
an aqueous solution of polyethylenimine;
a crosslinker for the polyethylenimine; and
a polymeric binder material.

As used herein, the term "crosslinker" refers to a compound that forms multiple covalent bonds to a material (e.g., PEI) resulting in crosslinking.

As used herein, the terms "polymer" and "polymeric" refer to organic polymers only.

As used herein, the term "aqueous" means containing at least 5 weight percent of water (e.g., at least 10, 20, 30, 40, 50, 60, 70, 80, 90 weight percent of water, or even 100 percent of water).

Features and advantages of the present disclosure will be further understood upon consideration of the detailed description as well as the appended claims.

BRIEF DESCRIPTION OF THE DRAWINGS

FIG. 1 is a schematic side view of an exemplary article 100 according to the present disclosure.

It should be understood that numerous other modifications and embodiments can be devised by those skilled in the art, which fall within the scope and spirit of the principles of the disclosure. The FIGURE may not be drawn to scale.

DETAILED DESCRIPTION

Compositions according to the present disclosure may comprise one or more compounds that are preparable, and optionally prepared, by reaction of components comprising an optionally crosslinked (e.g., using a crosslinker) polyethylenimine and at least one amine-reactive hydrolyzable organosilane.

Polyethylenimines include a large family of water-soluble polyamines of varying molecular weight. Polyethylenimines (PEIs) used in practice of the present disclosure may be linear, branched (e.g., randomly branched), or dendrimeric, as discussed hereinabove. Preferably, the PEIs are branched and contain a combination of primary and secondary amino nitrogen atoms.

It is generally known that the polymerization of ethylenimine (i.e., aziridine) itself does not result in a polymer that is completely composed of units having a linear structure, but that the degree of branching in polyethylenimine depends on the acid concentration and the temperature during polymerization. The degree of branching may, for example, vary between 12 and 38 percent. The formula of this type of branched polyethylenimine can be represented in the form of A, B, or C units, where A is an —$R^5$—$N(R^4)_2$ unit, B is an $R^4$—$N(R^5$—$)_2$ unit, and C is an (—$R^5$)$_3$N— unit, where $R^4$ is hydrogen and $R^5$ is an ethylene (—$CH_2CH_2$—) group. In some embodiments, the ratio of A to B to C units is from about 1:0.5:0.5 to about 1:2:1, preferably from about 1:1:1 to about 1:2:1.

Polyethylenimines are widely available from commercial sources including, for example, BASF Corp. (Florham Park, N.J.) under the trade designation "LUPASOL" polyethylenimine (e.g., LUPASOL FG, LUPASOL G 20, LUPASOL G 20 WF, LUPASOL G 35, and LUPASOL FT FP), and Sigma-Aldrich Corp. (St. Louis, Mo.).

The molecular weight of the PEI may be tailored depending on specific application requirements. In some embodiments, the PEI has a molecular weight ($M_w$) of 500 to 1500 g/mole. In some embodiments, the PEI has a molecular weight ($M_w$) of 1500 to 2000 g/mole. In some embodiments the PEI has a molecular weight ($M_w$) of 2000 to 5000 g/mole. In some embodiments the PEI has a molecular weight ($M_w$) of 5000 to 15000 g/mole. In some embodiments the PEI has a molecular weight ($M_w$) of 15000 to 30000 g/mole. In some embodiments the PEI has a molecular weight ($M_w$) of 30000 to 60000 g/mole. In some embodiments the PEI has a molecular weight ($M_w$) of 60000 to 100000 g/mole. In some embodiments the PEI has a molecular weight ($M_w$) of greater than or equal to 100000 g/mole.

In some embodiments, the polyethylenimine is crosslinked prior to, or simultaneous with, reaction with the amine-reactive hydrolyzable organosilane using a crosslinker. Suitable crosslinkers have a plurality (e.g., 2, 3, 4, or 5) of amine-reactive groups that form covalent bonds to the amino groups. Preferably, the crosslinker has two amine reactive groups. Typically, crosslinking is effected by simply combining the PEI and the crosslinker under relatively high dilution conditions (favoring intramolecular crosslinking) to minimize gelation caused by interchain crosslinking. Determination of appropriate conditions is within the capabilities of those skilled in the art.

Suitable crosslinkers for PEIs include, for example, polyfunctional compounds such as: halohydrins (e.g., epichlorohydrin); alkylene dihalides (e.g., 1,4-dibromobutane, 1,2-diiodoethane); polyfunctional acrylates (e.g., 1,6-hexanediol diacrylate, ethylene glycol diacrylate, diethylene glycol diacrylate, triethylene glycol diacrylate, tetraethylene glycol diacrylate, ethoxylated trimethylolpropane triacrylates, trimethylolpropane triacrylate, glycerol triacrylate, dipentaerythritol hexaacrylate); diepoxides (e.g., aliphatic, cycloaliphatic and glycidyl ether diepoxides such as, for example, vinylcyclohexene dioxide, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, bis(3,4-epoxy-6-methylcyclohexylmethyl)

adipate, dipentene dioxide, diglycidyl ether of bis-phenol A, diglycidyl ether of bis-phenol F, 1,4-butanediol diglycidyl ether); diesters (e.g., diethyl adipate, dimethyl fumarate, diethyl sebacate, and dimethyl maleate); divinylsulfone; polyfunctional acrylamides (e.g., piperazine diacrylamide, diacrylamide, N,N-methylene diacrylamide, and N,N'-(ethane-1,2-diyl) diacrylamide); polyisocyanates (e.g., hexamethylene diisocyanate, methylene diisocyanate), and polyaziridinyl compounds (e.g., tris-(1-aziridinyl)phosphine oxide), carbodiimides (e.g., 1-ethyl-3-(3-dimethylaminopropyl) carbodiimide), and N-hydroxysuccinimide.

In some embodiments, suitable crosslinkers may be represented by the formula

wherein each of R and Z is independently as previously defined. Examples include diacrylates (e.g., 1,6-hexanediol diacrylate, ethylene glycol diacrylate, diethylene glycol diacrylate, triethylene glycol diacrylate, and tetraethylene glycol diacrylate), triacrylates
(e.g., ethoxylated trimethylolpropane triacrylates, trimethylolpropane triacrylate, and glycerol triacrylate), diepoxides (e.g., aliphatic, cycloaliphatic and glycidyl ether diepoxides such as, for example, vinylcyclohexene dioxide, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, bis(3,4-epoxy-6-methylcyclohexylmethyl) adipate, dipentene dioxide, diglycidyl ether of bis-phenol A, diglycidyl ether of bis-phenol F, 1,4-butanediol diglycidyl ether), diesters (e.g., diethyl adipate, dimethyl fumarate, diethyl sebacate, and dimethyl maleate), divinylsulfone, and diacrylamides (e.g., piperazine diacrylamide, diacrylamide, N,N-methylene diacrylamide, and N,N'-(ethane-1,2-diyl)diacrylamide).

Additional crosslinkers are known in the art, and will be available to those of skill in the art.

Preferably, an amount of the crosslinker is used that results in reaction with from 1 to 10 percent of the available primary nitrogen atoms in the PEI, more preferably 3 to 8 percent.

Suitable amine-reactive hydrolyzable organosilane may be represented by the formula:

R—Z—SiY$_3$ wherein,

R represents an amine-reactive group containing 1 to 18 carbon atoms. Preferably, R contains 1 to 8 carbon atoms, more preferably 1 to 6 carbon atoms, and even more preferably 1 to 3 carbon atoms. Exemplary amine-reactive groups R include an isocyanato group (—N=C=O), an oxiranyl group

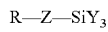

a glycidoxy group

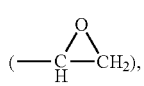

an acryl group

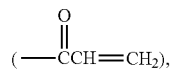

an acryloxy group

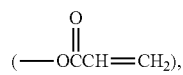

carboalkoxy groups having from 2 to 5 carbon atoms (e.g., carboethoxy group

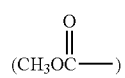

or a carbomethoxy group

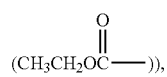

a vinylsulfonyl group

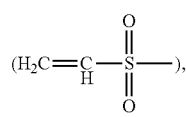

cyclic anhydride groups (e.g.,

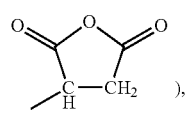

alkylcarbamato groups (e.g.,

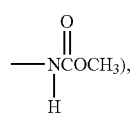

haloalkyl groups (e.g., BrCH$_2$— or ClCH$_2$—), and acrylamido groups (i.e.,

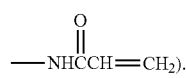

Z represents a divalent organic group containing 1 to 8 carbon atoms. In some embodiments, Z further contains from 1 to 6 heteroatoms selected from the group consisting of O, N, and S. Suitable divalent organic groups Z include, for example: hydrocarbylene groups having 1 to 8 carbon atoms, more preferably 1 to 6 carbon atoms, more preferably 1 to 4 carbon atoms, and even more preferably 1 to 3 carbon atoms; alkylenoxyalkylene having 1 to 8 carbon atoms, more preferably 1 to 6 carbon atoms, more preferably 1 to 4 carbon atoms; di(alkylene)amino groups having 1 to 8 carbon atoms, more preferably 1 to 6 carbon atoms, more preferably 1 to 4 carbon atoms; alkylenethiaalkylene groups having 1 to 8 carbon atoms, more preferably 1 to 6 carbon atoms, more preferably 1 to 4 carbon atoms. Specific examples of groups Z include methylene, ethylene, 1,2- and 1,3-propylene, butylene, isobutylene, hexylene, octylene, ethylcyclohexane-4,2'-diyl, ethylenoxyethylene, ethylenaminoethylene, ethylenoxypropylene, ethylenethiaethylene, and ethylene(methyl)aminoethylene. Of these, ethylene and 1,3-propylene are particularly preferred.

Each Y independently represents a hydrolyzable group. The term 'hydrolyzable group', as used herein, denotes a group that can be hydrolyzed, which means it can react with water to provide silanol groups (Si—OH groups) that can further react with groups (e.g., hydroxyl groups) on the surface of the substrate. The hydrolysis and condensation reactions may occur spontaneously and/or in the presence of a hydrolysis/condensation catalyst. Examples of hydrolyzable groups include halide groups, such as chlorine, bromine, iodine or fluorine, alkoxy groups (—OR$^1$ wherein R$^1$ represents an alkyl group, preferably containing 1 to 6, more preferably 1 to 4 carbon atoms, and which may optionally be substituted by one or more halogen atoms), acyloxy groups (—O—(C=O)—R$^2$ wherein R$^2$ is as defined for R$^1$), aryloxy groups (—OR$^3$ wherein R$^3$ represents an aryl moiety, preferably containing 6 to 12, more preferably containing 6 to 10 carbon atoms, which may be optionally substituted by one or more substituents independently selected from halogens and C$_1$-C$_4$ alkyl groups which may optionally be substituted by one or more halogen atoms). In the above formulas, R$^1$, R$^2$, and R$^3$ may include branched structures. In some preferred embodiments, each Y is independently selected from methoxy, ethoxy, hydroxy, acetoxy, chlorine, and bromine, of which methoxy and ethoxy are particularly preferred.

Specific examples of suitable amine-reactive hydrolyzable organosilanes include 3-isocyanatopropyltriethoxysilane, 3-isocyanatopropyltrimethoxysilane, 2-isocyanatoethyltriethoxysilane, 2-isocyanatoethyltrimethoxysilane, 3-acryloxypropyltriethoxysilane, 3-acryloxypropyltrimethoxysilane, 2-acryloxyethyltriethoxysilane, 2-acryloxyethyltrimethoxysilane, 2,3-epoxypropyltrimethoxysilane, 2,3-epoxypropyltriethoxysilane, 3-glycidoxypropyltriethoxysilane, 3-glycidoxypropyltrimethoxysilane, 2-(3,4-epoxycyclohexyl)ethyltrimethoxysilane, 2-(3,4-epoxycyclohexyl)ethyltriethoxysilane. Combinations of amine-reactive hydrolyzable organosilanes may be used.

Suitable amine-reactive hydrolyzable organosilanes may be purchased from commercial sources (e.g., as silane coupling agents, for example, from Gelest, Inc., Morrisville, Pa.) and/or can be prepared by known methods. Preferably, the amine-reactive hydrolyzable organosilanes are reactive with primary amino groups, and optionally with secondary and/or tertiary amino groups. Preferably, the amine-reactive hydrolyzable organosilanes react more rapidly with primary amino groups than secondary and tertiary groups (if at all).

Typically, from 5 to 70 percent of the primary amino groups, preferably 10 to 40 percent of the primary amino groups in the PEI are reacted with the amine-reactive hydrolyzable silane, although this is not a requirement. In order to minimize leaching, preferably, at least 3 (e.g., at least 4, at least 5, or even at least 6 hydrolyzable silane groups are attached to each PEI polymer chain. The reaction is typically carried out in an organic solvent, although water may be present if desired. Upon coating and drying of the silane-functionalized PEI on a substrate, the hydrolyzable groups hydrolyze and form siloxane crosslinks to other silane groups. This results in a crosslinked PEI disposed on the substrate, and depending on the specific substrate, it may be chemically bonded to the substrate (e.g., if the substrate has available hydroxyl groups at its surface; e.g., as in the case of cellulosic paper). Exemplary substrates may include any substrate described herein.

The composition preferably comprises a liquid vehicle, which may be organic and/or aqueous, although this is not a requirement. If present, the liquid vehicle should generally be chosen to minimize reaction between them and other components of the composition. Examples of organic vehicles include alcohols and ethers. Examples of aqueous liquid vehicles include water and water-alcohol mixtures (e.g., water-isopropanol mixtures). If a liquid vehicle is present, the other ingredients are preferably dissolved of dispersed in it. Any amount of the liquid vehicle can be used, and will typically depend on the particular composition and/or intended use.

Optionally, the composition may further comprise an additional polymeric binder. In embodiments wherein a liquid vehicle is present, the additional polymeric binder is preferably dispersible or soluble in the liquid vehicle. Exemplary additional polymeric binders include water-soluble polymers such as, for example, polyvinyl alcohol, hydroxyethyl cellulose, hydroxypropyl cellulose, and polymer latexes (e.g., polyurethane latexes, acrylic latexes, and vinyl acetate latexes). Suitable polymeric binders include film-forming polymeric binders, which may be provided, for example, as a latex. In some preferred embodiments, the latex is added to the composition prior to depositing the mixture on a substrate. Suitable film-forming polymers include acrylics (e.g., polybutyl acrylate and polymethyl methacrylate), ethylene-vinyl acetate copolymers (and partially or completely hydrolyzed versions thereof, polyvinyl alcohols, polyurethanes, polyamides, polyvinyl chloride, polystyrenes, polyesters, polycarbonates, natural and synthetic rubbers, and combinations thereof. The film-forming polymeric binder may be self-crosslinkable.

The composition may optionally further comprise various additives such as, for example, thickeners, fillers, fragrances, antioxidants, UV stabilizers, and surfactants.

Compositions according to the present disclosure can typically be prepared by simply mixing the various components in a vessel, optionally with heating or cooling.

Compositions according to the present disclosure are useful, for example, for method of making an article by coating at least a portion of a surface of a substrate with the composition, and then hydrolyzing at least some of the hydrolyzable groups to forms form covalent crosslinks (e.g., having Si—O—Si units) between PEI chains and/or the substrate. Hydrolysis may occur spontaneously on drying or standing Optional heating may be advantageous in some instances.

Referring now to FIG. 1, exemplary article 100 comprises crosslinked layer 110 (i.e., a crosslinked reaction product of a composition according to the present disclosure) disposed on surface 120 of substrate 130. Crosslinked layer typically is hydrophilic, due to the presence of amino groups; however, this is not a requirement. Layer 110 may have any thickness. In some embodiments, the thickness of the crosslinked layer is less than 25.4 microns, preferably less than 5 microns.

Suitable substrates may be transparent or opaque. For example, the substrate may comprise glass, organic polymer, metal, ceramic, fabric, paper, and/or wood. Specific examples of suitable substrates include vehicles (e.g., buses, trucks, cars, rail cars, locomotives, vans, trolleys, motor homes, airplanes, bicycles, boats, and barges), mirrors, windows, lenses, visors, bridges, exterior architectural panels, showers, bathtubs, trailers, signs (e.g., traffic signs, advertising signs, neon signs), substrates with polymeric clearcoats, and outdoor furniture (e.g., plastic or metal chairs and tables). In another embodiment, the substrate may comprise a transparent film (e.g., polyethylene terephthalate, polymethyl methacrylate, or polycarbonate), membrane (e.g., nylon membranes or polyethersulfone membranes), or paper that is adapted for use as an indicator in an automated endoscope recycling apparatus.

The composition can be applied by a suitable method including, for example, spin coating, dip coating, spraying, brushing, roll coating, gravure coating, curtain coating, knife coating, and slot coating. In some embodiments, heating may be advantageously applied after coating (e.g., to facilitate crosslinking and/or remove any optional solvent).

SELECT EMBODIMENTS OF THE PRESENT DISCLOSURE

In a first embodiment, the present disclosure provides a composition comprising a compound preparable by reaction of components comprising a polyethylenimine and at least one an amine-reactive hydrolyzable organosilane represented by the formula:

R—Z—SiY$_3$ wherein:
R represents an amine-reactive group containing 1 to 18 carbon atoms;
Z represents a divalent organic group containing 1 to 8 carbon atoms; and
each Y independently represents a hydrolyzable group.

In a second embodiment, the present disclosure provides a composition according to the first embodiment, further comprising an aqueous liquid vehicle in which the compound is dispersed or dissolved.

In a third embodiment, the present disclosure provides a composition according to the first or second embodiment, wherein R has from 1 to 3 carbon atoms.

In a fourth embodiment, the present disclosure provides a composition according to any one of the first to third embodiments, wherein R is selected from the group consisting of an isocyanato group, an oxiranyl group, a glycidoxy group, an acryloxy group, a carboethoxy group, a carbomethoxy group, a vinylsulfonyl group, and an acrylamido group.

In a fifth embodiment, the present disclosure provides a composition according to any one of the first to fourth embodiments, wherein Z further contains from 1 to 6 heteroatoms selected from the group consisting of O, N, and S.

In a sixth embodiment, the present disclosure provides a composition according to any one of the first to fifth embodiments, wherein Z comprises an alkylene group containing 1 to 3 carbon atoms.

In a seventh embodiment, the present disclosure provides a composition according to any one of the first to sixth embodiments, wherein each Y is independently selected from methoxy, ethoxy, hydroxy, acetoxy, chlorine, and bromine.

In an eighth embodiment, the present disclosure provides a composition according to any one of the first to seventh embodiments, wherein the at least one an amine-reactive hydrolyzable organosilane is selected from the group consisting of 3-isocyanatopropyltriethoxysilane, 3-isocyanatopropyltrimethoxysilane, 2-isocyanatoethyltriethoxysilane, 2-isocyanatoethyltrimethoxysilane, 3-acryloxypropyltriethoxysilane, 3-acryloxypropyltrimethoxysilane, 2-acryloxyethyltriethoxysilane, 2-acryloxyethyltrimethoxysilane, 2,3-epoxypropyltrimethoxysilane, 2,3-epoxypropyltriethoxysilane, 3-glycidoxypropyltriethoxysilane, and 3-glycidoxypropyltrimethoxysilane.

In a ninth embodiment, the present disclosure provides a composition according to any one of the first to eighth embodiments, further comprising a polymeric binder material.

In a tenth embodiment, the present disclosure provides a composition comprising compound preparable by reaction of components comprising a crosslinked polyethylenimine and at least one an amine-reactive hydrolyzable organosilane represented by the formula:

R—Z—SiY$_3$ wherein:
R represents an amine-reactive group containing 1 to 18 carbon atoms;
Z represents a divalent organic group containing 1 to 8 carbon atoms; and
each Y independently represents a hydrolyzable group.

In an eleventh embodiment, the present disclosure provides a composition according to the tenth embodiment, further comprising an aqueous liquid vehicle in which the compound is dispersed or dissolved.

In a twelfth embodiment, the present disclosure provides a composition according to the tenth or eleventh embodiment, wherein the crosslinked polyethylenimine comprises a reaction product of a polyamine and a crosslinker represented by the formula

R—Z—R wherein each of R and Z is independently as previously defined.

In a thirteenth embodiment, the present disclosure provides a composition according to any one of the tenth to twelfth embodiments, wherein R has from 1 to 3 carbon atoms.

In a fourteenth embodiment, the present disclosure provides a composition according to any one of the tenth to thirteenth embodiments, wherein R is selected from the group consisting of an isocyanato group, an oxiranyl group, a glycidoxy group, an acryloxy group, a carboethoxy group, a carbomethoxy group, a vinylsulfonyl group, and an acrylamido group.

In a fifteenth embodiment, the present disclosure provides a composition according to any one of the tenth to fourteenth embodiments, wherein Z further contains from 1 to 6 heteroatoms selected from the group consisting of O, N, and S.

In a sixteenth embodiment, the present disclosure provides a composition according to any one of the tenth to fifteenth embodiments, wherein Z comprises an alkylene group containing 1 to 3 carbon atoms.

In a seventeenth embodiment, the present disclosure provides a composition according to any one of the tenth to sixteenth embodiments, wherein each Y is independently selected from methoxy, ethoxy, hydroxy, acetoxy, chlorine, and bromine.

In an eighteenth embodiment, the present disclosure provides a composition according to any one of the tenth to seventeenth embodiments, wherein the at least one an amine-reactive hydrolyzable organosilane is selected from the group consisting of 3-isocyanatopropyltriethoxysilane, 3-isocyanatopropyltrimethoxysilane, 2-isocyanatoethyltriethoxysilane, 2-isocyanatoethyltrimethoxysilane, 3-acryloxypropyltriethoxysilane, 3-acryloxypropyltrimethoxysilane, 2-acryloxyethyltriethoxysilane, 2-acryloxyethyltrimethoxysilane, 2,3-epoxypropyltrimethoxysilane, 2,3-epoxypropyltriethoxysilane, 3-glycidoxypropyltriethoxysilane, and 3-glycidoxypropyltrimethoxysilane.

In a nineteenth embodiment, the present disclosure provides a composition according to any one of the tenth to eighteenth embodiments, further comprising a polymeric binder material.

In a twentieth embodiment, the present disclosure provides a method of making an article, the method comprising:
coating at least a portion of a surface of a substrate with a composition according to any one of the first to nineteenth embodiments disposed thereon, and hydrolyzing at least some of the hydrolyzable groups Y.

In a twenty-first embodiment, the present disclosure provides a method according to the twentieth embodiment, wherein the compound becomes covalently bonded to the surface of the substrate.

In a twenty-second embodiment, the present disclosure provides a method according to the twentieth or twenty-first embodiment, wherein the compound becomes crosslinked with formation of Si—O—Si units.

In a twenty-third embodiment, the present disclosure provides an article comprising:
a substrate having a surface; and
a reaction product of a composition according to according to any one of the first to nineteenth embodiments and at least a portion of the surface of the substrate.

In a twenty-fourth embodiment, the present disclosure provides an article comprising:
a substrate having a surface; and
a crosslinked reaction product of a composition according to any one of the first to nineteenth embodiments disposed on at least a portion of the surface.

In a twenty-fifth embodiment, the present disclosure provides a composition comprising an intimate mixture of a crosslinked polyethylenimine and a polymeric binder material.

In a twenty-sixth embodiment, the present disclosure provides a composition according to the twenty-fifth embodiment, wherein the crosslinked polyethylenimine is a reaction product of polyethyleneimine and an acrylic monomer having at least two acryl groups.

In a twenty-seventh embodiment, the present disclosure provides a composition according to the twenty-fifth or twenty-sixth embodiment, wherein the crosslinked polyethylenimine and the polymeric binder material are dispersed or dissolved in an aqueous liquid vehicle.

In a twenty-eighth embodiment, the present disclosure provides a method of making a composition, the method comprising sequentially intimately mixing:
an aqueous solution of polyethylenimine;
a crosslinker for the polyethylenimine; and
a polymeric binder material.

In a twenty-ninth embodiment, the present disclosure provides a method according to the twenty-eighth embodiment, wherein the crosslinker for the polyethylenimine comprises an acrylic monomer having at least two acryl groups.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

TABLE OF REAGENTS

| | |
|---|---|
| Branched polyethylenimine (MW 60K g/mole, 50 wt. % in water) | Thermo Fisher Scientific, Waltham, Massachusetts |
| Branched polyethylenimine (MW 50-100K g/mole, 30 wt. % in water) | Polysciences, Inc., Warrington, Pennsylvania |
| Branched polyethylenimine (MW 25K g/mole, cat# 408727) | Sigma-Aldrich Corp., St. Louis, Missouri |
| Branched polyethylenimine (MW 800 g/mole, cat# 408719) | Sigma-Aldrich Corp. |
| Polyethylenimine (80% ethoxylated, 37 wt. % in water, MW 50K) | Sigma-Aldrich Corp. |
| 3-(Acryloxypropyl)trimethoxysilane (AS) | Gelest, Inc., Morrisville, Pennsylvania |
| 3-Glycidoxypropyltrimethoxysilane (GPS) | Gelest, Inc. |
| PZ-28 polyfunctional aziridine | PolyAziridine LLC., Medford, New Jersey |
| Diethyl glutaconate | Sigma-Aldrich Corp. |
| SR454 (3 mole ethoxylated trimethylolpropane triacrylate) | Sartomer Corp., Exton, Pennsylvania |
| SR415 (20 mole ethoxylated trimethylolpropane triacrylate) | Sartomer Corp. |
| INCOREZ C58057 polyurethane dispersion | Incorez Ltd., Lancashire, England |
| NEOREZ R966 polyurethane dispersion (R966) | DSM Corp., Elgin, Illinois |
| NEOCRYL A612 polyacrylic dispersion (A612) | DSM Corp. |
| POVAL 49-88 polyvinyl alcohol | Kuraray Ltd., Singapore |
| Polyvinyl pyrrolidone K90, MW 360K g/mole | Sigma-Aldrich Corp. |
| Nalco 1115 aqueous silica nanoparticle dispersion (spherical, 4 nm) | Nalco Co., Naperville, Illinois |
| 3-aminopropyltriethoxysilane and 3-aminopropyltrimethoxysilane | Sigma-Aldrich Corp. |
| IRGACURE 184 (1-hydroxycyclohexyl) phenyl ketone | BASF Corp., Florham Park, New Jersey |
| ortho-phthalaldehyde (RAPICIDE OPA/28) | Medivators, Inc., Minneapolis, Minnesota |

Example 1

Branched polyethylenimine (MW 25,000 g/mole, available from Sigma-Aldrich Corporation (cat #408727) and diluted to a 3 wt. % aqueous solution, abbreviation of "bPEI") was mixed with a 3 wt. % aqueous solution of 3-(acryloxypropyl)trimethoxysilane (abbreviation of "AS", Gelest Inc.) in a ratio of 4:1 by weight bPEI:AS to form Solution A. NEOCRYL A612 (abbreviation of "A612", DSM Corporation) was diluted with distilled water to prepare a 3 wt. % solution (Solution B). Solutions A and B were then mixed together in a ratio of 2:3 by weight Solution A:Solution B to form the final coating formulation. A sample of filter paper (Whatman 410) was dip coated with the coating formulation and then dried at 80° C. for 3 minutes. The dried sample was cut into test strips (20 mm by 40 mm). The coated surface of the test strips was white in color.

Individual testing solutions of ortho-phthalaldehyde (OPA) in water were prepared at concentrations of 0.10 wt. %, and 0.35 wt. % OPA. The test strips were evaluated by immersing a test strip into a bath of the OPA testing solution for 5 minutes with the bath temperature maintained at 25° C. The test strip was removed from the bath and checked for a color change by visual examination. In addition, test strips were evaluated to determine if any indicator color from a test strip leached into the OPA bath. For this test a new test strip was immersed and maintained in a fresh OPA bath (0.35 wt. % at 25° C.) for 30 minutes. The bath contained the minimum amount of OPA to fully cover the test strip (typically 1-2 mL). The test strip was then removed from the bath and the bath liquid was checked for color change by visual examination (no leaching=colorless bath, leaching=change in bath color from colorless to either a pale yellow or yellow color). The results are reported in Table 1.

Example 2

The procedure of Example 1 was followed, except that Solutions A and B were mixed together in a ratio of 1:1 by weight Solution A:Solution B to form the final coating formulation. The results are reported in Table 1.

Example 3

The procedure of Example 1 was followed, except that Solutions A and B were mixed together in a ratio of 3:2 by weight Solution A:Solution B to form the final coating formulation. The results are reported in Table 1.

Example 4

Branched polyethylenimine (MW 25,000 g/mole, available from Sigma-Aldrich Corporation (cat #408727) and diluted to a 3 wt. % aqueous solution) was mixed with a 3 wt. % aqueous solution of 3-(acryloxypropyl)trimethoxysilane (abbreviation of "AS", Gelest Inc.) in a ratio of 7:3 by weight bPEI:AS to form Solution C. A612 was diluted with distilled water to prepare a 3 wt. % solution (Solution D). Solutions C and D were then mixed together in a ratio of 1:9 by weight Solution C:Solution D to form the final coating formulation. A sample of filter paper (Whatman 410) was dip coated with the coating formulation and then dried at 80° C. for 3 minutes. The dried sample was cut into test strips (20 mm by 40 mm). The coated surface of the test strips was white in color. The test strips were evaluated for color change and color leaching according to the procedure described in Example 1. The results are reported in Table 1.

Example 5

The procedure of Example 4 was followed, except that Solutions C and D were mixed together in a ratio of 2:3 by weight Solution C:Solution D to form the final coating formulation. The results are reported in Table 1.

Example 6

The procedure of Example 4 was followed, except that Solutions C and D were mixed together in a ratio of 1:1 by weight Solution C:Solution D to form the final coating formulation. The results are reported in Table 1.

Example 7

The procedure of Example 4 was followed, except that Solutions C and D were mixed together in a ratio of 3:2 by weight Solution C:Solution D to form the final coating formulation. The results are reported in Table 1.

Example 8

Branched polyethylenimine (MW 25,000 g/mole, available from Sigma-Aldrich Corporation (cat #408727) and diluted to a 3 wt. % aqueous solution) was mixed with a 3 wt. % aqueous solution of 3-(acryloxypropyl)trimethoxysilane in a ratio of 3:2 by weight bPEI:AS to form Solution E. A612 was diluted with distilled water to prepare a 3 wt. % solution (Solution F). Solutions E and F were then mixed together in a ratio of 2:3 by weight Solution E:Solution F to form the final coating formulation. A sample of filter paper (Whatman 410) was dip coated with the coating formulation and then dried at 80° C. for 3 minutes. The dried sample was cut into test strips (20 mm by 40 mm). The coated surface of the test strips was white in color. The test strips were evaluated for color change and color leaching according to the procedure described in Example 1. The results are reported in Table 1.

Example 9

The procedure of Example 8 was followed, except that Solutions E and F were mixed together in a ratio of 1:1 by weight Solution E:Solution F to form the final coating formulation. The results are reported in Table 1.

Example 10

The procedure of Example 8 was followed, except that Solutions E and F were mixed together in a ratio of 3:2 by weight Solution E:Solution F to form the final coating formulation. The results are reported in Table 1.

Example 11

Branched polyethylenimine (MW 25,000 g/mole, available from Sigma-Aldrich Corporation (cat #408727) and diluted to a 3 wt. % aqueous solution) was mixed with a 3 wt. % aqueous solution of 3-(acryloxypropyl)trimethoxysilane in a ratio of 1:1 by weight bPEI:AS to form Solution G. A612 was diluted with distilled water to prepare a 3 wt. % solution (Solution H). Solutions G and H were then mixed together in a ratio of 1:9 by weight Solution G:Solution H to form the final coating formulation. A sample of filter paper (Whatman 410) was dip coated with the coating formulation and then dried at 80° C. for 3 minutes. The dried sample was cut into test strips (20 mm by 40 mm). The coated surface of the test strips was white in color. The test strips were evaluated for color change and color leaching according to the procedure described in Example 1. The results are reported in Table 1.

Example 12

Branched polyethylenimine (MW 25,000 g/mole, available from Sigma-Aldrich Corporation (cat #408727) and diluted to a 3 wt. % aqueous solution) was mixed with a 3 wt. % aqueous solution of SR454 mutifunctional acrylate (ethoxylated trimethylolpropane triacrylate, Sartomer Corporation, Exton, Pa.) in a ratio of 4:1 by weight bPEI:SR454 to form the coating formulation. A sample of filter paper (Whatman 410) was dip coated with the coating formulation and then dried at 80° C. for 3 minutes. The dried sample was cut into test strips (20 mm by 40 mm). The coated surface of the test strips was white in color. The test strips were evaluated for color change and color leaching according to the procedure described in Example 1. The results are reported in Table 1, below

TABLE 1

| Test Strip of | Test Strip Color after Immersion in 0.1 wt. % OPA | Test Strip Color after Immersion in 0.35 wt. % OPA Bath | Color from Test Strip Leached into 0.35 wt. % OPA Bath |
|---|---|---|---|
| Example 1 | pale yellow | yellow | no |
| Example 2 | pale yellow | yellow | no |
| Example 3 | pale yellow | yellow | no |
| Example 4 | not tested | pale yellow | no |
| Example 5 | pale yellow | yellow | no |
| Example 6 | pale yellow | yellow | no |
| Example 7 | pale yellow | yellow | no |
| Example 8 | pale yellow | yellow | no |
| Example 9 | pale yellow | yellow | no |
| Example 10 | pale yellow | yellow | no |
| Example 11 | not tested | colorless | no |
| Example 12 | pale yellow | yellow | no |

For Examples 1-3 and 5-10 colorimetric analysis of the test strips following immersion in an OPA bath was conducted using an X-Rite SP64 colorimeter (X-Rite Inc.). The collected CIE L*a*b* color scale values (established by the International Commission on Illumination) are reported in Table 2, below.

TABLE 2

| Test Strip of | Color Scale for Test Strip after Immersion in 0.1 wt. % OPA | | | Color Scale for Test Strip after Immersion in 0.35 wt. % OPA | | |
|---|---|---|---|---|---|---|
| | L* | a* | b* | L* | a* | b* |
| Example 1 | 86.5 | −6.4 | 26.1 | 85.7 | −7.4 | 47.6 |
| Example 2 | 87.3 | −3.5 | 13.9 | 85.0 | −7.8 | 48.1 |
| Example 3 | 88.4 | −7.1 | 26.8 | 81.2 | −6.6 | 25.9 |
| Example 5 | 88.9 | −4.4 | 16.8 | 86.8 | −6.9 | 51.6 |
| Example 6 | 89.8 | −3.2 | 13.1 | 86.5 | −7.9 | 51.0 |
| Example 7 | 89.5 | −7.1 | 28.7 | 84.0 | −8.3 | 36.5 |
| Example 8 | 89.8 | −5.1 | 19.4 | 82.9 | −7.5 | 50.3 |
| Example 9 | 87.2 | −3.4 | 13.7 | 86.0 | −8.0 | 52.7 |
| Example 10 | 83.2 | −7.2 | 31.3 | 87.3 | −9.1 | 43.3 |

Example 13

Branched polyethylenimine (MW 25,000 g/mole, available from Sigma-Aldrich Corporation (cat #408727) and diluted to a 3 wt. % aqueous solution) was mixed with a 3 wt. % aqueous solution of 3-(acryloxypropyl)trimethoxysilane (abbreviation of AS) in a ratio of 7:3 by weight bPEI:AS to form Solution I. NEOREZ R966 polyurethane dispersion (abbreviation of "R966", DSM Corporation) was diluted with distilled water to prepare a 3 wt. % solution (Solution J). Solutions I and J were then mixed together in a ratio of 1:9 by weight Solution I:Solution J to form the final coating formulation. A sample of filter paper (Whatman 410) was dip coated with the coating formulation and then dried at 80° C. for 3 minutes. The dried sample was cut into test strips (20 mm by 40 mm). The coated surface of the test strips was white in color.

A testing solution of ortho-phthalaldehyde (OPA) in water was prepared at a concentration of 0.35 wt. % OPA. The test strips were evaluated by immersing a test strip into a bath of the OPA testing solution for 5 minutes with the bath temperature maintained at 25° C. The test strip was removed from the bath and checked for a color change by visual examination. Test strips were evaluated to determine if any indicator color from a test strip leached into the OPA bath using the procedure described in Example 1. The results are reported in Table 3.

Example 14

The procedure of Example 13 was followed, except that Solutions I and J were mixed together in a ratio of 3:7 by weight Solution I:Solution J to form the final coating formulation. The results are reported in Table 3.

Example 15

The procedure of Example 13 was followed, except that Solutions I and J were mixed together in a ratio of 1:1 by weight Solution I:Solution J to form the final coating formulation. The results are reported in Table 3.

Example 16

Branched polyethylenimine (MW 25,000 g/mole, available from Sigma-Aldrich Corporation (cat #408727) and diluted to a 3 wt. % aqueous solution) was mixed with a 3 wt. % aqueous solution of 3-(acryloxypropyl)trimethoxysilane in a ratio of 1:1 by weight bPEI:AS to form Solution K. 8966 polyurethane dispersion was diluted with distilled water to prepare a 3 wt. % solution (Solution L). Solutions K and L were then mixed together in a ratio of 1:9 by weight Solution K:Solution L to form the final coating formulation. A sample of filter paper (Whatman 410) was dip coated with the coating formulation and then dried at 80° C. for 3 minutes. The dried sample was cut into test strips (20 mm by 40 mm). The coated surface of the test strips was white in color. The test strips were evaluated for color change according to the procedure described in Example 1. Test strips were also evaluated to determine if any indicator color from a test strip leached into the OPA bath using the procedure described in Example 1. The results are reported in Table 3.

Example 17

The procedure of Example 16 was followed, except that Solutions K and L were mixed together in a ratio of 3:7 by weight Solution K:Solution L to form the final coating formulation. The results are reported in Table 3.

Example 18

The procedure of Example 16 was followed, except that Solutions K and L were mixed together in a ratio of 1:1 by weight Solution K:Solution L to form the final coating formulation. The results are reported in Table 3, below.

TABLE 3

| Test Strip of | Test Strip Color after Immersion in 0.35 wt. % OPA | Color from Test Strip Leached into 0.35 wt. % OPA Bath |
|---|---|---|
| Example 13 | pale yellow | no |
| Example 14 | yellow | no |
| Example 15 | bright yellow | no |
| Example 16 | pale yellow | not tested |
| Example 17 | yellow | no |
| Example 18 | bright yellow | no |

TABLE 4

| Test Strip of Example | bPEI:AS | Time to Color Change after Immersion in 0.1 wt. % OPA, seconds | Time to Color Change after Immersion in 0.35 wt. % OPA, seconds | Color from Test Strip Leached into 0.35 wt. % OPA Bath |
|---|---|---|---|---|
| 19 | 9:1 | 210 | 67 | no |
| 20 | 4:1 | 260 | 80 | no |
| 21 | 7:3 | 253 | 115 | no |
| 22 | 3:2 | no change at 300 | 151 | no |
| 23 | 1:1 | no change at 300 | 170 | no |
| 24 | 2:3 | no change at 300 | 183 | no |

Example 19

Branched polyethylenimine (MW 25,000 g/mole, available from Sigma-Aldrich Corporation (cat #408727) and diluted to a 2.5 wt. % aqueous solution) was mixed with a 2.5 wt. % aqueous solution of 3-(acryloxypropyl)trimethoxysilane in a ratio of 9:1 by weight bPEI:AS to form the final coating formulation. A sample of nylon 6,6 membrane (single reinforced layer nylon three zone membrane with nominal pore size of 1.8 microns, #080ZN, obtained from 3M Purification Inc., Meriden, Conn.) was dip coated with the coating formulation and then dried at 80° C. for 3 minutes. The dried sample was cut into test strips (20 mm by 40 mm). The coated surface of the test strips was white in color.

Individual testing solutions of ortho-phthalaldehyde (OPA) in water were prepared at concentrations of 0.10 wt. %, and 0.35 wt. % OPA. The test strips were evaluated by immersing a test strip into a bath of the OPA testing solution for 5 minutes with the bath temperature maintained at 25° C. The time point at which a color change of the test strip was first observed was recorded. Test strips were also evaluated to determine if any indicator color from a test strip leached into the OPA bath using the procedure described in Example 1. The results are reported in Table 4.

Example 20

The procedure of Example 19 was followed, except that the ratio of bPEI:AS in the final coating formulation was 4:1. The results are reported in Table 4.

Example 21

The procedure of Example 19 was followed, except that the ratio of bPEI:AS in the final coating formulation was 7:3. The results are reported in Table 4.

Example 22

The procedure of Example 19 was followed, except that the ratio of bPEI:AS in the final coating formulation was 3:2. The results are reported in Table 4.

Example 23

The procedure of Example 19 was followed, except that the ratio of bPEI:AS in the final coating formulation was 1:1. The results are reported in Table 4.

Example 24

The procedure of Example 19 was followed, except that the ratio of bPEI:AS in the final coating formulation was 2:3. The results are reported in Table 4, below.

Example 25

Branched polyethylenimine (MW 25,000 g/mole, available from Sigma-Aldrich Corporation (cat #408727) and diluted to a 2.0 wt. % aqueous solution) was mixed with a 2.0 wt. % aqueous solution of 3-(acryloxypropyl)trimethoxysilane (abbreviation of "AS") in a ratio of 9:1 by weight bPEI:AS to form the final coating formulation. A sample of nylon membrane (described in Example 19) was dip coated with the coating formulation and then dried at 80° C. for 3 minutes. The dried sample was cut into test strips (20 mm by 40 mm). The coated surface of the test strips was white in color. The test strips were evaluated for time to color change according to the procedure described in Example 19. Test strips were also evaluated to determine if any indicator color from a test strip leached into the OPA bath using the procedure described in Example 1. The results are reported in Table 5.

Example 26

The procedure of Example 25 was followed, except that the ratio of bPEI:AS in the final coating formulation was 4:1. The results are reported in Table 5.

Example 27

The procedure of Example 25 was followed, except that the ratio of bPEI:AS in the final coating formulation was 7:3. The results are reported in Table 5.

Example 28

The procedure of Example 25 was followed, except that the ratio of bPEI:AS in the final coating formulation was 3:2. The results are reported in Table 5.

Example 29

The procedure of Example 25 was followed, except that the ratio of bPEI:AS in the final coating formulation was 1:1. The results are reported in Table 5.

Example 30

The procedure of Example 25 was followed, except that the ratio of bPEI:AS in the final coating formulation was 2:3. The results are reported in Table 5, below.

TABLE 5

| Test Strip of Example | bPEI:AS | Time to Color Change after Immersion in 0.1 wt. % OPA, seconds | Time to Color Change after Immersion in 0.35 wt. % OPA, seconds | Color from Test Strip Leached into 0.35 wt. % OPA Bath |
|---|---|---|---|---|
| 25 | 9:1 | 240 | 75 | no |
| 26 | 4:1 | 260 | 87 | no |
| 27 | 7:3 | no change at 300 | 120 | no |
| 28 | 3:2 | no change at 300 | 160 | no |
| 29 | 1:1 | no change at 300 | 180 | no |
| 30 | 2:3 | no change at 300 | 210 | no |

Example 31

Branched polyethylenimine (MW 25,000 g/mole, available from Sigma-Aldrich Corporation (cat #408727) and diluted to a 2.5 wt. % aqueous solution) was mixed with a 2.5 wt. % aqueous solution of SR454 multifunctional acrylate in a ratio of 4:1 by weight bPEI:SR454 to form the coating formulation. A sample of nylon membrane (described in Example 19) was dip coated with the coating formulation and then dried at 80° C. for 3 minutes. The dried sample was cut into test strips (20 mm by 40 mm). The coated surface of the test strips was white in color. The test strips were evaluated for the time to color change according to the procedure described in Example 19. Test strips were also evaluated to determine if any indicator color from a test strip leached into the OPA bath using the procedure described in Example 1. The results are reported in Table 6.

Example 32

The procedure of Example 31 was followed, except that the ratio of bPEI:SR454 in the final coating formulation was 7:3. The results are reported in Table 6.

Example 33

The procedure of Example 31 was followed, except that the ratio of bPEI:SR454 in the final coating formulation was 3:2. The results are reported in Table 6.

Example 34

The procedure of Example 31 was followed, except that the ratio of bPEI:SR454 in the final coating formulation was 1:1. The results are reported in Table 6.

Example 35

The procedure of Example 31 was followed, except that the ratio of bPEI:SR454 in the final coating formulation was 2:3. The results are reported in Table 6, below.

TABLE 6

| Test Strip of Example | bPEI:SR454 | Time to Color Change after Immersion in 0.1 wt. % OPA, seconds | Time to Color Change after Immersion in 0.35 wt. % OPA, seconds | Color from Test Strip Leached into 0.35 wt. % OPA Bath |
|---|---|---|---|---|
| 31 | 4:1 | 180 | 40 | no |
| 32 | 7:3 | 210 | 63 | no |
| 33 | 3:2 | 260 | 86 | no |
| 34 | 1:1 | no change at 300 | 97 | no |
| 35 | 2:3 | no change at 300 | 145 | no |

Example 36

Branched polyethylenimine (MW 800, available from Sigma-Aldrich Corporation (cat #408719), abbreviation of "bPEI800") and diluted to a 2.5 wt. % aqueous solution) was mixed with a 2.5 wt. % aqueous solution of SR454 multifunctional acrylate in ratios of either 7:3, 1:1, or 2:3 by weight bPEI800:SR454 to form three separate coating formulations. Separate samples of nylon membrane (described in Example 19) were dip coated with one of the formulations and then dried at 80° C. for 3 minutes. The dried samples were cut into test strips (20 mm by 40 mm). The coated surface of the test strips was white in color. When the test strips were immersed into OPA baths according to the procedure described in Example 1 leaching of color into the test bath was observed for all of the test strips (visual examination). The greatest amount of color leaching was observed for the sample prepared with 9:1 ratio of bPEI800:SR454. The least amount of color leaching was observed for the sample with a 2:3 ratio of bPEI800:SR454.

Example 37

Branched polyethylenimine (MW 25,000 g/mole, available from Sigma-Aldrich Corporation (cat #408727) and diluted to a 2.5 wt. % aqueous solution, abbreviation of "bPEI") was mixed with a 2.5 wt. % aqueous solution of SR454 multifunctional acrylate in a ratio of 9:1 by weight bPEI:SR454 to form the coating formulation. A sample of nylon membrane (described in Example 19) was dip coated with the coating formulation and then dried at 80° C. for 3 minutes. The dried sample was cut into test strips (20 mm by 40 mm). The coated surface of the test strips was white in color.

A testing solution of ortho-phthalaldehyde (OPA) in water was prepared at a concentration of 0.35 wt. % OPA. The test strips were evaluated by immersing a test strip into a bath of the OPA testing solution for 5 minutes with the bath temperature maintained at 25° C. The test strip was removed from the bath and checked for a color change from white to yellow. Test strips were also evaluated to determine if any indicator color from a test strip leached into the OPA bath using the procedure described in Example 1. The results are reported in Table 7.

Example 38

Branched polyethylenimine (MW 25,000 g/mole, available from Sigma-Aldrich Corporation (cat #408727) and diluted to a 2.5 wt. % aqueous solution, abbreviation of "bPEI") was mixed with a 2.5 wt. % aqueous solution of SR454 multifunctional acrylate in a ratio of 9:1 by weight bPEI:SR454 to form Solution M. NEOCRYL A612 was diluted with distilled water to prepare a 2.5 wt. % solution (Solution N). Solutions M and N were then mixed together in a ratio of 1:1 by weight Solution M:Solution N to form the final coating formulation. A sample of nylon membrane (described in Example 19) was dip coated with the coating formulation and then dried at 80° C. for 3 minutes. The dried sample was cut into test strips (20 mm by 40 mm). The coated surface of the test strips was white in color. The test strips were evaluated by immersion in an OPA bath according to the procedure described in Example 37. The results are reported in Table 7.

Example 39

Branched polyethylenimine (MW 25,000 g/mole, available from Sigma-Aldrich Corporation (cat #408727) and diluted to a 2.5 wt. % aqueous solution, abbreviation of "bPEI") was mixed with a 2.5 wt. % aqueous solution of SR454 multifunctional acrylate in a ratio of 9:1 by weight bPEI:SR454 to form Solution M. NEOREZ R966 polyurethane dispersion was diluted with distilled water to prepare a 2.5 wt. % solution (Solution O). Solutions M and O were then mixed together in a ratio of 1:1 by weight Solution M:Solution O to form the final coating formulation. A sample of nylon membrane (described in Example 19) was dip coated with the coating formulation and then dried at 80° C. for 3 minutes. The dried sample was cut into test strips (20 mm by 40 mm). The coated surface of the test strips was white in color. The test strips were evaluated by immersion in an OPA bath according to the procedure described in Example 37. The results are reported in Table 7.

Example 40

The procedure of Example 37 was followed, except that the ratio of bPEI:SR454 in the final coating formulation was 7:3. The results are reported in Table 7.

Example 41

Branched polyethylenimine (MW 25,000 g/mole, available from Sigma-Aldrich Corporation (cat #408727) and diluted to a 2.5 wt. % aqueous solution, abbreviation of "bPEI") was mixed with a 2.5 wt. % aqueous solution of SR454 multifunctional acrylate in a ratio of 7:3 by weight bPEI:SR454 to form Solution P. NEOCRYL A612 was diluted with distilled water to prepare a 2.5 wt. % solution (Solution Q). Solutions P and Q were then mixed together in a ratio of 1:1 by weight Solution P:Solution Q to form the final coating formulation. A sample of nylon membrane (described in Example 19) was dip coated with the coating formulation and then dried at 80° C. for 3 minutes. The dried sample was cut into test strips (20 mm by 40 mm). The coated surface of the test strips was white in color. The test strips were evaluated by immersion in an OPA bath according to the procedure described in Example 37. The results are reported in Table 7.

Example 42

Branched polyethylenimine (MW 25,000 g/mole, available from Sigma-Aldrich Corporation (cat #408727) and diluted to a 3 wt. % aqueous solution, abbreviation of "bPEI") was mixed with a 2.5 wt. % aqueous solution of SR454 multifunctional acrylate in a ratio of 7:3 by weight bPEI:SR454 to form Solution P. NEOREZ R966 polyurethane dispersion was diluted with distilled water to prepare a 2.5 wt. % solution (Solution R). Solutions P and R were then mixed together in a ratio of 1:1 by weight Solution P:Solution R to form the final coating formulation. A sample of nylon membrane (described in Example 19) was dip coated with the coating formulation and then dried at 80° C. for 3 minutes. The dried sample was cut into test strips (20 mm by 40 mm). The coated surface of the test strips was white in color. The test strips were evaluated by immersion in an OPA bath according to the procedure described in Example 37. The results are reported in Table 7, below.

TABLE 7

| Test Strip of Example | Color of Test Strip after 5 min Immersion in 0.35 wt. % OPA | Color from Test Strip Leached into 0.35 wt. % OPA Bath |
| --- | --- | --- |
| 37 | yellow | yes |
| 38 | yellow | yes |
| 39 | yellow | yes |
| 40 | bright yellow | no |
| 41 | bright yellow | no |
| 42 | bright yellow | no |

Example 43

Branched polyethylenimine (MW 25,000 g/mole, available from Sigma-Aldrich Corporation (cat #408727) and diluted to a 2.5 wt. % aqueous solution) was mixed with a 2.5 wt. % aqueous solution of crosslinker 3-glycidoxypropyl trimethoxysilane (abbreviation="GPS", available from Gelest Inc.) in ratios of either 9:1, 4:1, or 7:3 by weight bPEI:crosslinker to form three separate coating formulations. Separate samples of nylon membrane (described in Example 19) were dip coated with one of the formulations and then dried at 80° C. for 3 minutes. The dried samples were cut into test strips (20 mm by 40 mm). The coated surface of the test strips was white in color. The test strips were immersed into OPA baths according to the procedure described in Example 19. The test strips were evaluated for time to color change according to the procedure described in Example 19. Test strips were also evaluated to determine if any indicator color from a test strip leached into the OPA bath using the procedure described in Example 1. The results are reported in Table 8. In addition, in a separate experiment the color of each strip was determined by visual inspection after being immersed in the OPA bath for 80 seconds and 300 seconds. At the 80 second time point, the test strips were a very pale yellow color. At the 300 second time point the test strips were a bright yellow color.

TABLE 8

| Test Strip of Example | bPEI:crosslinker | Time to Color Change after Immersion in 0.1 wt. % OPA, seconds | Time to Color Change after Immersion in 0.35 wt. % OPA, seconds | Color from Test Strip Leached into 0.35 wt. % OPA Bath |
| --- | --- | --- | --- | --- |
| 43 | 9:1 | 210 | 67 | no |
| 43 | 4:1 | 260 | 80 | no |
| 43 | 7:3 | 293 | 115 | no |

Example 44

Branched polyethylenimine (MW 25,000 g/mole, available from Sigma-Aldrich Corporation (cat #408727) and diluted to a 2.5 wt. % aqueous solution, abbreviation of "bPEI") was mixed with a 2.5 wt. % aqueous solution of 3-(acryloxypropyl)trimethoxysilane (abbreviation of "AS") in a ratio of 4:1 by weight bPEI:AS to form the final coating formulation. A sample of nylon membrane (described in Example 19) was dip coated with the coating formulation and then dried at 80° C. for 3 minutes. The dried sample was cut into test strips (20 mm by 40 mm). The coated surface of the test strips was white in color.

Individual testing solutions of ortho-phthalaldehyde (OPA) in water were prepared at concentrations of 0.10 wt. %, and 0.35 wt. % OPA. The test strips were evaluated by immersing a test strip into a bath prepared from the testing solution and maintained at either 10° C., 20° C., 25° C., or 30° C. The test strips were also immersed in the bath for varying periods of time (1.0, 1.35, 1.62, or 5 minutes). Prior to immersion in the OPA bath some of the test strips were immersed in a bath of 1% Intercept detergent (Medivators Inc.) for 7.5 minutes followed by immersion in a fresh distilled water bath for an additional 7.5 minutes and then air drying. Each test sample was removed from the OPA bath and the reflectance measurement of the test strip was determined at an emitted wavelength 450 nm using an X-Rite Handheld Spectrophotometer X-Rite eXact NGH Handheld Spectrophotometer with a 1.5 mm aperture (X-Rite Inc.). The mean reflectance values (n=3) and corresponding test conditions are reported in Table 9, below.

TABLE 9

| OPA Conc. In Bath, wt. % | Bath Temp, ° C. | Immersion Time, minutes | Pretreatment with Detergent | Reflectance, % |
|---|---|---|---|---|
| 0.35 | 30 | 1.0 | yes | 41 |
| 0.35 | 25 | 1.35 | yes | 47 |
| 0.35 | 20 | 1.62 | yes | 57 |
| 0.35 | 10 | 5 | yes | 55 |
| 0.35 | 25 | 5 | yes | 30 |
| 0.35 | 30 | 1.0 | no | 50 |
| 0.35 | 25 | 1.35 | no | 47 |
| 0.35 | 20 | 1.62 | no | 63 |
| 0.35 | 10 | 5 | no | 68 |
| 0.35 | 25 | 5 | no | 27 |
| 0.10 | 25 | 5 | yes | 50 |
| 0.10 | 25 | 5 | no | 55 |

Example 45

Branched polyethylenimine (MW 25,000 g/mole, available from Sigma-Aldrich Corporation (cat #408727) and diluted to a 2.5 wt. % aqueous solution, abbreviation of "bPEI") was mixed with a 2.5 wt. % aqueous solution of NEOREZ R966 polyurethane dispersion in a weight ratio of 1:1 to form the coating formulation. A sample of nylon membrane (described in Example 19) was coated with a #24 Meyer rod (RD Specialties, Webster, N.Y.) and then dried at 80° C. for 3 minutes. The dried sample was cut into test strips (20 mm by 40 mm). The coated surface of the test strips was white in color.

A testing solution of ortho-phthalaldehyde (OPA) in water was prepared at a concentration of 0.35 wt. % OPA. The test strips were evaluated by immersing a test strip into a bath of the OPA testing solution for either 1.35 or 5 minutes with the bath temperature maintained at 25° C. Each test sample was removed from the bath and the reflectance measurement of the test strip was determined at an emitted wavelength 440 nm using an X-Rite Handheld Spectrophotometer X-Rite eXact NGH Handheld Spectrophotometer with a 1.5 mm aperture (X-Rite Inc.). The mean reflectance values (n=3) and corresponding test conditions are reported in Table 10.

Example 46

Branched polyethylenimine (MW 25,000 g/mole, available from Sigma-Aldrich Corporation (cat #408727) and diluted to a 2.5 wt. % aqueous solution, abbreviation of "bPEI") was mixed with a 2.5 wt. % aqueous solution of 3-(acryloxypropyl)trimethoxysilane (abbreviation of "AS") in a weight ratio of 7:3 to form the coating formulation. A sample of nylon membrane (described in Example 19) was coated with a #24 Meyer rod and then dried at 80° C. for 3 minutes. The dried sample was cut into test strips (20 mm by 40 mm). The coated surface of the test strips was white in color. The test strips were evaluated by immersion in an OPA bath according to the procedure described in Example 45. The mean reflectance values (n=3) and corresponding test conditions are reported in Table 10.

Example 47

Branched polyethylenimine (MW 25,000 g/mole, available from Sigma-Aldrich Corporation (cat #408727) and diluted to a 2.5 wt. % aqueous solution, abbreviation of "bPEI") was mixed with a 2.5 wt. % aqueous solution of 3-(acryloxypropyl)trimethoxysilane (abbreviation of "AS") in a weight ratio of 7:3 to form Solution S. NEOREZ R966 polyurethane dispersion was diluted with distilled water to prepare a 2.5 wt. % solution (Solution T). Solutions S and T were then mixed together to form a final coating formulation with a weight ratio of 7:3:7 bPEI:AS:R966. A sample of nylon membrane (described in Example 19) was coated with a #24 Meyer rod and then dried at 80° C. for 3 minutes. The dried sample was cut into test strips (20 mm by 40 mm). The coated surface of the test strips was white in color. The test strips were evaluated by immersion in an OPA bath according to the procedure described in Example 45. The mean reflectance values (n=3) and corresponding test conditions are reported in Table 10, below.

TABLE 10

| Test Strip of Example | Immersion Time, minutes | wt. % OPA | Reflectance, % |
|---|---|---|---|
| 45 | 1.35 | 0.35 | 73 |
| 45 | 5 | 0.35 | 55 |
| 46 | 1.35 | 0.35 | 67 |
| 46 | 5 | 0.35 | 18 |
| 47 | 1.35 | 0.35 | 70 |
| 47 | 5 | 0.35 | 14 |

Example 48

Branched polyethylenimine (abbreviation of bPEI, MW 60,000 g/mole as a 50 wt. % solution in water) was mixed with a 30 wt. % polyurethane dispersion (#CS 8057, Incorez Copolymer Ltd., United Kingdom) and distilled water to form a coating formulation with a ratio of 1:3 by weight bPEI:polyurethane dispersion. The coating formulation (50 microliters) was applied as a circular dot to the surface of an injection molded chip (60 mm by 50 mm by 1 mm) of Bayblend T85 stock white (a polycarbonate (PC) and acrylonitrile butadiene styrene (ABS) blend; available from Bayer Material Science, Leverkusen, Germany). The chip with coated test dot was then dried at 100° C. for 15 minutes resulting in a clear coating over the white substrate.

Individual testing solutions of ortho-phthalaldehyde (OPA) in water were prepared at concentrations of 0.35 wt. % and 0.575 wt. % OPA. The coated chips were evaluated by immersing the coated portion of the chip into a bath prepared from the testing solution and maintained at 25° C. The chips were immersed in the bath for either 1.35 minutes or 5 minutes. Each chip was removed from the bath and the coated dot was checked by visual inspection for a change in color from white to yellow. The results are reported in Table 11.

Example 49

The procedure of Example 48 was followed, except that the ratio of bPEI:polyurethane dispersion in the coating formulation was set at 1:1 by weight.

Example 50

The procedure of Example 48 was followed, except that the ratio of bPEI:polyurethane dispersion in the coating formulation was set at 3:1 by weight. Results are reported in Table 11, below.

TABLE 11

| Example | bPEI: polyurethane dispersion | Color of Test Dot following Immersion in Bath | | |
| --- | --- | --- | --- | --- |
| | | 1.35 min in 0.35 wt. % OPA | 5 min in 0.35 wt. % OPA | 5 min in 0.575 wt. % OPA |
| 48 | 1:3 | very pale yellow | pale yellow | pale yellow |
| 49 | 1:1 | very pale yellow | yellow | yellow |
| 50 | 3:1 | very pale yellow | bright yellow | bright yellow |

Example 51

A testing solution of ortho-phthalaldehyde (OPA) in water was prepared at a concentration of 0.35 wt. % OPA. Test chips prepared according to Example 51 were evaluated by immersing the coated portion of a test chip into a bath prepared from a testing solution with the bath temperature maintained at either 20° C., 25° C., or 30° C. The test chips were immersed in the bath for varying periods of time (1.0, 1.35, 1.62, or 5 minutes). Each test chip was removed from the bath and reflectance of the test dot was determined at an emitted wavelength of 440 nm using an X-Rite Handheld Spectrophotometer X-Rite eXact NGH Handheld Spectrophotometer with a 1.5 mm aperture (X-Rite Inc.). The mean reflectance values (n=3) and the corresponding test conditions are reported in Table 12.

Example 52

The same testing procedure as reported in Example 51 was followed, except that prior to immersion in the OPA bath the coated chips were immersed in a bath of 1% Intercept detergent (Medivators, Inc.) for 7.5 minutes followed by immersion in a fresh distilled water bath for an additional 7.5 minutes and then air drying. Results are reported in Table 12, below.

TABLE 12

| Example | Bath Temp, ° C. | Immersion Time, minutes | Detergent Used in method | Reflectance, % |
| --- | --- | --- | --- | --- |
| 52 | 30 | 1.0 | yes | 28 |
| 52 | 25 | 1.35 | yes | 20 |
| 52 | 20 | 1.62 | yes | 24 |
| 52 | 25 | 5 | yes | 5 |
| 51 | 30 | 1.0 | no | 35 |
| 51 | 25 | 1.35 | no | 23 |
| 51 | 20 | 1.62 | no | 27 |
| 51 | 25 | 5 | no | 13 |

Examples 53-61

The coating formulations for Examples 53-61 were prepared by pre-mixing branched polyethylenimine (bPEI, MW 60,000 g/mole as a 50 wt. % solution in water, available from Thermo Fisher Scientific, that was diluted to 10 wt. % in water) and R966 (10 wt. % in water). The crosslinkers 3-glycidoxypropyl trimethoxysilane (abbreviation="GPS" and prepared as 10 wt. % in isopropyl alcohol) and PZ-28 (a polyfunctional aziridine available from PolyAziridine LLC., Medford, N.J. and prepared as 10 wt. % in isopropyl alcohol) were added next with continued mixing to provide the specified coating formulations. The amount of each component (as 10 wt. % solutions) in a formulation is listed in Table 13. Each coating formulation was individually coated onto a separate clear PET polyester film substrate (5 mil) using a #24 Meyer rod. The coated films were dried at 85° C. for 5-10 minutes to form a clear coat. Test strips (about 25 mm by 102 mm) were prepared from the coated films. A bath of OPA (0.575 wt. % in water) was prepared and each test strip was evaluated by immersing the test strip in the bath for 300 seconds. The bath was maintained at 25° C. The color of the test strip was determined by visual inspection after being immersed for 80 seconds and 300 seconds. The integrity of the test strip was determined by visually inspecting each test strip at 300 seconds for any signs of haze, cracking, blister formation, or swelling. In addition, test strips were evaluated to determine if any indicator color from a test strip leached into the OPA bath. For this test a new test strip was immersed and maintained in a fresh OPA bath (0.575 wt. % at 25° C.) for 30 minutes. The bath contained the minimum amount of OPA to fully cover the test strip (typically 1-2 mL). The test strip was then removed from the bath and the bath liquid was checked for color change by visual examination (no leaching=colorless bath, while leaching=change in bath color from colorless to either a pale yellow or yellow color). The results for color change (at 80 and 300 seconds), test strip integrity, and leaching are reported in Table 14.

TABLE 13

| Example | bPEI, g | R966, g | GPS, g | PZ-28, g |
| --- | --- | --- | --- | --- |
| 53 | 5 | 5 | 0 | 0.15 |
| 54 | 5 | 5 | 0 | 0.3 |
| 55 | 5 | 5 | 0 | 0.45 |
| 56 | 4 | 6 | 0 | 0.3 |
| 57 | 3 | 7 | 0 | 0.15 |
| 58 | 5 | 5 | 0.25 | 0.45 |
| 59 | 6 | 4 | 0.6 | 0.2 |
| 60 | 7 | 3 | 0.7 | 0.15 |
| 61 | 8 | 2 | 0.8 | 0.1 |

TABLE 14

| Example | Color after Immersion for 80 sec | Color after Immersion for 300 sec | Test Strip Integrity | Color from Test Strip Leached into 0.575 wt. % OPA Bath |
|---|---|---|---|---|
| 53 | clear to very pale yellow | bright yellow | no issue | yes |
| 54 | clear to very pale yellow | bright yellow | no issue | yes |
| 55 | clear to very pale yellow | bright yellow | no issue | yes |
| 56 | pale yellow | bright yellow | no issue | no |
| 57 | pale yellow | bright yellow | no issue | no |
| 58 | pale yellow | bright yellow | no issue | no |
| 59 | clear to very pale yellow | bright yellow | no issue | no |
| 60 | clear to very pale yellow | bright yellow | no issue | no |
| 61 | pale yellow | bright yellow | no issue | no |

Examples 62-68

The coating formulations for Examples 62-68 were prepared by pre-mixing branched polyethylenimine (bPEI, MW 60,000 g/mole as a 50 wt. % solution in water, available from Thermo Fisher Scientific, that was diluted to 10 wt. % in water) and R966 (10 wt. % in water). The crosslinker GPS (neat liquid) or AS (neat liquid) was added next with continued mixing to form the specified coating formulations. The amount of each component in a formulation is listed in Table 15. Each coating formulation was individually coated onto a separate clear PET polyester film substrate (5 mil) using a #24 Meyer rod. The coated films were dried at 85° C. for 5-10 minutes to form a clear coat. Test strips (about 25 mm by 102 mm) were prepared from the coated films.

The test strips were evaluated for color change (at 80 and 300 seconds) and for integrity of the test strip according to the procedure described for Example 53. The results are reported in Table 16.

TABLE 15

| Example | bPEI, g | R966, g | GPS, g | AS, g |
|---|---|---|---|---|
| 62 | 60 | 40 | 0 | 0.6 |
| 63 | 60 | 40 | 0.6 | 0 |
| 64 | 70 | 30 | 0 | 0.7 |
| 65 | 80 | 20 | 0 | 0.8 |
| 66 | 80 | 20 | 0.8 | 0 |
| 67 | 90 | 10 | 0 | 0.9 |
| 68 | 95 | 5 | 0 | 0.95 |

TABLE 16

| Example | Color after Immersion for 80 sec | Color after Immersion for 300 sec | Test Strip Integrity |
|---|---|---|---|
| 62 | clear to very pale yellow | bright yellow | no issue |
| 63 | clear to very pale yellow | bright yellow | no issue |
| 64 | clear to very pale yellow | bright yellow | no issue |
| 65 | clear to very pale yellow | bright yellow | no issue |
| 66 | clear to very pale yellow | bright yellow | slight cracking |
| 67 | not determined | not determined | cracking |
| 68 | not determined | not determined | cracking |

Example 69

Branched polyethylenimine (bPEI, MW 60,000 g/mole as a 50 wt. % solution in water, available from Thermo Fisher Scientific, that was diluted to 10 wt. % in water), crosslinker AS (neat liquid), and polyvinyl alcohol (POVAL 49-88, available from Kuraray Ltd., Singapore; abbreviation="PVA") were mixed together to form the coating formulation (amounts listed in Table 17). The coating formulation was coated onto a clear PET polyester film substrate (5 mil) using a #24 Meyer rod and then dried at 85° C. for 5-10 minutes to form a clear coat. Test strips (about 25 mm by 102 mm) were prepared from the coated film.

The test strips were evaluated for color change (at 80 and 300 seconds) and for integrity of the test strip according to the procedure described for Example 53. The results are reported in Table 18.

Example 70

Branched polyethylenimine (bPEI, MW 60,000 g/mole as a 50 wt. % solution in water, available from Thermo Fisher Scientific, that was diluted to 10 wt. % in water), crosslinker AS (neat liquid), and polyvinyl pyrrolidone (K90, MW=360,000 g/mole, available from Sigma-Aldrich Corporation, abbreviation="PVP") were mixed together to form the coating formulation (amounts listed in Table 17). The coating formulation was coated onto a clear PET polyester film substrate (5 mil) using a #24 Meyer rod and then dried at 85° C. for 5-10 minutes to form a clear coat. Test strips (about 25 mm by 102 mm) were prepared from the coated film.

The test strips were evaluated for color change (at 80 and 300 seconds) and for integrity of the test strip according to the procedure described for Example 53. The results are reported in Table 18.

Examples 71-75

The coating formulations for Examples 71-75 were prepared by pre-mixing branched polyethylenimine (bPEI, MW 60,000 g/mole as a 50 wt. % solution in water, available from Thermo Fisher Scientific that was diluted to 10 wt. % in water) and 8966 (10 wt. % in water). With continued mixing the crosslinker AS (neat liquid) was added followed by the addition of PVA (10 wt. % solution in water). The amount of each component in a formulation is listed in Table 17. Each coating formulation was individually coated onto a separate clear PET polyester film substrate (5 mil) using a #24 Meyer rod. The coated films were dried at 85° C. for 5-10 minutes to form a clear coat. Test strips (about 25 mm by 102 mm) were prepared from the coated films.

The test strips were evaluated for color change (at 80 and 300 seconds) and for integrity of the test strip according to the procedure described for Example 53. The results are reported in Table 18.

TABLE 17

| Example | bPEI, g | R966, g | AS, g | PVA, g | PVP, g |
|---|---|---|---|---|---|
| 69 | 50 | 0 | 0.5 | 50 | 0 |
| 70 | 50 | 0 | 0.5 | 0 | 50 |
| 71 | 50 | 25 | 0.5 | 25 | 0 |
| 72 | 50 | 16.7 | 0.5 | 33.3 | 0 |
| 73 | 50 | 12.5 | 0.5 | 37.5 | 0 |
| 74 | 70 | 15 | 0.7 | 15 | 0 |
| 75 | 30 | 35 | 0.3 | 35 | 0 |

TABLE 18

| Example | Color after Immersion for 80 sec | Color after Immersion for 300 sec | Test Strip Integrity |
|---|---|---|---|
| 69 | clear to very pale yellow | bright yellow | slight cracking and haze |
| 70 | not determined | not determined | slight cracking and haze |
| 71 | clear to very pale yellow | bright yellow | haze |
| 72 | clear to very pale yellow | bright yellow | slight haze |
| 73 | clear to very pale yellow | bright yellow | haze |
| 74 | pale yellow | bright yellow | slight haze |
| 75 | clear to very pale yellow | bright yellow | haze |

Examples 76-87

The coating formulations for Examples 76-87 were prepared by pre-mixing branched polyethylenimine (bPEI, MW 60,000 g/mole as a 50 wt. % solution in water, available from Thermo Fisher Scientific, that was diluted to 10 wt. % in water) and R966 (10 wt. % in water). The crosslinkers 3-(acryloxypropyl)trimethoxysilane (abbreviation="AS", and prepared as 10 wt. % in isopropyl alcohol) and PZ-28 (prepared as 10 wt. % in isopropyl alcohol) were added next with continued mixing to form the specified coating formulations. The amount of each component (as 10 wt. % solutions) in a formulation is listed in Table 19. Each coating formulation was individually coated onto a separate clear PET polyester film substrate (5 mil) using a #24 Meyer rod. The coated films were dried at 85° C. for 5-10 minutes to form a clear coat. Test strips (about 25 mm by 102 mm) were prepared from the coated films. The test strips were evaluated for color change (at 80 and 300 seconds), color leaching, and test strip integrity according to the procedure described for Example 53. The results are reported in Table 20.

TABLE 19

| Example | bPEI, g | R966, g | AS, g | PZ-28, g |
|---|---|---|---|---|
| 76 | 7 | 3 | 0.7 | 0 |
| 77 | 7 | 3 | 0.7 | 0.15 |
| 78 | 7 | 3 | 0.35 | 0 |
| 79 | 7 | 3 | 0.35 | 0.15 |
| 80 | 5 | 5 | 0.5 | 0 |
| 81 | 5 | 5 | 0.5 | 0.25 |
| 82 | 5 | 5 | 0.25 | 0.25 |
| 83 | 5 | 5 | 0.7 | 0.15 |
| 84 | 3 | 7 | 0.3 | 0 |
| 85 | 3 | 7 | 0.3 | 0.35 |
| 86 | 3 | 7 | 0.15 | 0 |
| 87 | 3 | 7 | 0.15 | 0.35 |

TABLE 20

| Example | Color after Immersion for 80 sec | Color after Immersion for 300 sec | Test Strip Integrity | Color from Test Strip Leached into 0.575 wt. % OPA Bath |
|---|---|---|---|---|
| 76 | clear to very pale yellow | bright yellow | no issue | no |
| 77 | clear to very pale yellow | bright yellow | no issue | no |
| 78 | clear to very pale yellow | bright yellow | no issue | yes |
| 79 | clear to very pale yellow | bright yellow | no issue | no |
| 80 | clear to very pale yellow | bright yellow | no issue | no |
| 81 | clear to very pale yellow | bright yellow | no issue | no |
| 82 | clear to very pale yellow | bright yellow | no issue | no |
| 83 | clear to very pale yellow | bright yellow | no issue | no |
| 84 | pale yellow | bright yellow | no issue | no |
| 85 | pale yellow | bright yellow | no issue | no |
| 86 | pale yellow | bright yellow | no issue | no |
| 87 | pale yellow | bright yellow | no issue | no |

Examples 88-92

The coating formulations for Examples 88-92 were prepared by pre-mixing branched polyethylenimine (bPEI, MW 60,000 g/mole as a 50 wt. % solution in water, available from Thermo Fisher Scientific, that was diluted to 10 wt. % in water) and R966 (10 wt. % in water). The crosslinkers 3-(acryloxypropyl)trimethoxysilane (abbreviation="AS", and prepared as 10 wt. % in isopropyl alcohol) and PZ-28 (prepared as 10 wt. % in isopropyl alcohol) were added next with continued mixing to form the specified coating formulations. The amount of each component in a formulation (as 10 wt. % solutions) is listed in Table 21. Each coating formulation was individually coated onto a separate clear PET polyester film substrate (10 mil) using a #30 Meyer rod. The coated films were dried at 110° C. for 10 minutes to form a clear coat. Test strips (about 25 mm by 102 mm) were prepared from the coated films. A testing solution of ortho-phthalaldehyde (OPA) in water was prepared at a concentration of 0.35 wt. % OPA. The test strips were evaluated by immersing a test strip into a bath of the OPA testing solution for either 1.35 or 5 minutes with the bath temperature maintained at 25° C. Following immersion the test strip was removed from the testing solution, immersed in a fresh bath of distilled water for 15 minutes, and then rinsed with isopropyl alcohol for about 5 seconds. The test strip was placed on a white background and the reflectance measurement of the test strip was determined at an emitted wavelength 450 nm using an X-Rite Handheld Spectrophotometer X-Rite eXact NGH Handheld Spectrophotometer with a 4 mm aperture (X-Rite Inc.). The mean reflectance values (n=3) and corresponding test conditions are reported in Table 22.

TABLE 21

| Example | bPEI, g | R966, g | AS, g | PZ-28, g |
|---|---|---|---|---|
| 88 | 5 | 5 | 0.25 | 0 |
| 89 | 3 | 7 | 0.15 | 0 |
| 90 | 7 | 3 | 0.7 | 0 |
| 91 | 7 | 3 | 0.7 | 0.15 |
| 92 | 5 | 5 | 0.5 | 0.25 |

TABLE 22

| | Mean Reflectance, % | |
|---|---|---|
| Test Strip of Example | OPA Bath Immersion Time of 1.35 Min | OPA Bath Immersion Time of 5 Min |
| 88 | 49 | 15 |
| 89 | 58 | 34 |
| 90 | 43 | 8 |

TABLE 22-continued

| | Mean Reflectance, % | |
|---|---|---|
| Test Strip of Example | OPA Bath Immersion Time of 1.35 Min | OPA Bath Immersion Time of 5 Min |
| 91 | 51 | 12 |
| 92 | 58 | 16 |

Examples 93-95

The coating formulations for Examples 93-95 were prepared by pre-mixing branched polyethylenimine (bPEI, MW 60,000 g/mole as a 50 wt. % solution in water, available from Thermo Fisher Scientific, that was diluted to 10 wt. % in water) and polyacrylic dispersion A612 (10 wt. % in water). The crosslinkers 3-glycidoxypropyl trimethoxysilane (GPS, neat) and PZ-28 (prepared as 10 wt. % in isopropyl alcohol) were added next with continued mixing to form the specified coating formulations. The amount of each component in a formulation is listed in Table 23. Each coating formulation was individually coated onto a separate clear PET polyester film substrate (5 mil) using a #24 Meyer rod. The coated films were dried at 85° C. for 5-10 minutes to form a clear coat. Test strips (about 25 mm by 102 mm) were prepared from the coated films. The test strips were evaluated for color change (at 80 and 300 seconds), color leaching, and test strip integrity according to the procedure described for Example 53. The results are reported in Table 24.

TABLE 23

| Example | bPEI (10 wt. %), g | A612 (10 wt. %), g | GPS (neat), g | PZ-28 (10 wt. %), g |
|---|---|---|---|---|
| 93 | 7 | 3 | 0.07 | 0.15 |
| 94 | 5 | 5 | 0.05 | 0.25 |
| 95 | 3 | 7 | 0.03 | 0.35 |

TABLE 24

| Example | Color after Immersion for 80 sec | Color after Immersion for 300 sec | Test Strip Integrity | Color from Test Strip Leached into 0.575 wt. % OPA Bath |
|---|---|---|---|---|
| 93 | pale yellow | bright yellow | no issue | no |
| 94 | pale yellow | bright yellow | no issue | no |
| 95 | pale yellow | bright yellow | no issue | no |

Examples 96-97

Branched polyethylenimine (bPEI, MW 60,000 g/mole as a 50 wt. % solution in water, available from Thermo Fisher Scientific that was diluted to 5 wt. % in water) and diethyl glutaconate (Sigma-Aldrich Corporation) were mixed together to form the coating formulations (amounts listed in Table 25). Separate samples of nylon membrane (described in Example 19) were dip coated with one of the coating formulations. The coated samples were dried at 120° C. for 5 minutes to form a clear coat. Test strips (about 25 mm by 102 mm) were prepared from the coated samples.

The test strips were evaluated for color change (at 80 and 300 seconds) and for leaching according to the procedure described for Example 53. In addition, the time point at which a color change of the test strip was first observed was recorded. The results are reported in Table 26.

TABLE 25

| Example | bPEI (5 wt. %), g | Diethyl glutaconate (neat), g |
|---|---|---|
| 96 | 9 | 0.05 |
| 97 | 5 | 0.25 |

TABLE 26

| Example | Time to Initial Color Change, seconds | Color after Immersion for 80 sec clear | Color after Immersion for 300 sec | Color from Test Strip Leached into 0.575 wt. % OPA Bath |
|---|---|---|---|---|
| 96 | 43 | to very pale yellow | brown-yellow | no |
| 97 | 47 | clear to very pale yellow | brown-yellow | no |

Examples 98-100

The coating formulations for Examples 98-100 were prepared by mixing ethoxylated polyethylenimine (MW 50,000 g/mole as a 37 wt. % solution in water, available from Sigma-Aldrich Corporation that was diluted to 5 wt. % in water) and 3-(acryloxypropyl)trimethoxysilane (abbreviation of "AS", Gelest Inc.) in the amounts listed in Table 27. Separate samples of nylon membrane (described in Example 19) were dip coated with one of the coating formulations. The coated samples were dried at 120° C. for 5 minutes to form a clear coat. Test strips (about 25 mm by 102 mm) were prepared from the coated samples.

The test strips were evaluated for color change (at 80 and 300 seconds) and for leaching according to the procedure described for Example 53. In addition, the time point at which a color change of the test strip was first observed was recorded. The results are reported in Table 28.

TABLE 27

| Example | Ethoxylated polyethylenimine (5 wt. %), g | AS (neat), g |
|---|---|---|
| 98 | 10 | 0 |
| 99 | 10 | 0.1 |
| 100 | 10 | 0.2 |

TABLE 28

| Example | Time to Initial Color Change, seconds | Color after Immersion for 80 sec | Color after Immersion for 300 sec | Color from Test Strip Leached into 0.575 wt. % OPA Bath |
|---|---|---|---|---|
| 98 | 17 | pale yellow | bright yellow | yes |
| 99 | 56 | pale yellow | bright yellow | no |
| 100 | 67 | very pale yellow | bright yellow | no |

Example 101

The coating formulation was prepared by first mixing 7 g of branched polyethylenimine (bPEI, MW 60,000 g/mole as a 50 wt. % solution in water, available from Thermo Fisher Scientific, that was diluted to 10 wt. % in water) and 3 g of R966 (10 wt. % in water). The crosslinkers diethyl glutaconate (0.14 g, neat) and PZ-28 (0.15 g, prepared as 10 wt. % in isopropyl alcohol) were added next with continued mixing to form the coating formulation. The formulation was coated onto a clear PET polyester film substrate (10 mil) using a #24 Meyer rod. The coated film was dried at 120° C. for 5 minutes to form a clear coat. Test strips (about 25 mm by 102 mm) were prepared from the coated films. Test strips were evaluated for color change (at 80 and 300 seconds), color leaching, and test strip integrity according to the procedure described for Example 53. The results are reported in Table 29, below.

TABLE 29

| Example | Color after Immersion for 80 sec | Color after Immersion for 300 sec | Test Strip Integrity | Color from Test Strip Leached into 0.575 wt. % OPA Bath |
|---|---|---|---|---|
| 101 | clear to very pale yellow | bright yellow | no issue | no |

Example 102

The coating formulation was prepared by first mixing 6.3 g of branched polyethylenimine (bPEI, MW 60,000 g/mole as a 50 wt. % solution in water, available from Thermo Fisher Scientific, that was diluted to 10 wt. % in water) and 2.7 g of R966 (10 wt. % in water). The crosslinkers 3-(acryloxypropyl)trimethoxysilane (0.63 g of a 10 wt. % solution in isopropyl alcohol) and PZ-28 (0.14 g of a 10 wt. % in isopropyl alcohol) were added next with continued mixing. Finally, 1 g of Nalco 1115, aqueous silica nanoparticle dispersion (spherical, 4 nm, 15 wt. %; available from Nalco Company, Naperville, Ill.) was added with mixing to form the coating formulation. The formulation was coated onto a clear PET polyester film substrate (10 mil) using a #24 Meyer rod. The coated film was dried at 120° C. for 5 minutes to form a clear coat. Test strips (about 25 mm by 102 mm) were prepared from the coated films. The test strips were evaluated for color change (at 80 and 300 seconds), color leaching, and test strip integrity according to the procedure described for Example 53. The results are reported in Table 30.

Example 103

A modified silica nanoparticle dispersion was prepared by adding with mixing 1.77 g of 3-aminopropyltriethoxysilane (Sigma-Aldrich Corporation) was added with mixing to 50 g of a 10 wt. % Nalco 1115 aqueous silica nanoparticle dispersion. The resulting dispersion was heated at 80° C. for 12 hours and then cooled to room temperature.

The coating formulation was prepared by first mixing 6.3 g of branched polyethylenimine (bPEI, MW 60,000 g/mole as a 50 wt. % solution in water, available from Thermo Fisher Scientific, that was diluted to 10 wt. % in water) and 2.7 g of R966 (10 wt. % in water). The crosslinkers 3-(acryloxypropyl)trimethoxysilane (0.63 g of a 10 wt. % solution in isopropyl alcohol) and PZ-28 (0.14 g of a 10 wt. % in isopropyl alcohol) were added next with continued mixing. Finally, 1 g the modified silica nanoparticle dispersion (described above) was added with mixing to form the coating formulation. The formulation was coated onto a clear PET polyester film substrate (10 mil) using a #24 Meyer rod. The coated film was dried at 120° C. for 5 minutes to form a clear coat. Test strips (about 25 mm by 102 mm) were prepared from the coated films. The test strips were evaluated for color change (at 80 and 300 seconds), color leaching, and test strip integrity according to the procedure described for Example 53. The results are reported in Table 30, below.

TABLE 30

| Example | Color after Immersion for 80 sec | Color after Immersion for 300 sec | Test Strip Integrity | Color from Test Strip Leached into 0.575 wt. % OPA Bath |
|---|---|---|---|---|
| 102 | pale yellow | bright yellow | no issue | no |
| 103 | clear to very pale yellow | bright yellow | no issue | no |

Examples 104-107

The coating formulations for Examples 136-139 were prepared by pre-mixing branched polyethylenimine (bPEI, MW 60,000 g/mole as a 50 wt. % solution in water, available from Thermo Fisher Scientific, that was diluted to 5 wt. % with added ethanol) with a 5 wt. % ethanol solution of SR415 multifunctional acrylate (20 mole ethoxylated trimethylolpropane triacrylate, Sartomer Corporation). Next a 5 wt. % solution of the photoinitiator IRGACURE 184 (1-hydroxycyclohexyl phenyl ketone, BASF Corporation, Florham Park, N.J.) in ethanol was added with mixing followed by the optional addition of a 5 wt. % solution of R966 in ethanol with continued mixing. The amount of each component in a formulation is listed in Table 31. Each of the resulting coating formulations was individually coated onto a separate clear PET polyester film substrate (5 mil) using a #24 Meyer rod. The coated films were dried at 100° C. for 5 minutes and then cured under a nitrogen atmosphere by 3 passes through a UV curing station (model MC-6RQN, Fusion UV Curing Inc., Rockville, Md.) with a Fusion "H" lamp at a speed of 12.2 meters/minute to form a clear coating. Test strips (about 25 mm by 102 mm) were prepared from the coated films. The test strips were evaluated for color change (at 80 and 300 seconds), color leaching, and test strip integrity according to the procedure described for Example 53. The results are reported in Table 32.

TABLE 31

| Example | bPEI (5 wt. %), g | SR415 (5 wt. %), g | R966 (5 wt. %), g | IRGACURE 184, mg |
|---|---|---|---|---|
| 104 | 9 | 1 | 0 | 10 |
| 105 | 7 | 3 | 0 | 30 |
| 106 | 8.5 | 1.5 | 4.3 | 15 |
| 107 | 3 | 3 | 4.4 | 30 |

TABLE 32

| Example | Color after Immersion for 80 sec | Color after Immersion for 300 sec | Test Strip Integrity | Color from Test Strip Leached into 0.575 wt. % OPA Bath |
|---|---|---|---|---|
| 104 | clear to very pale yellow | bright yellow | no issue | no |
| 105 | clear to very pale yellow | bright yellow | no issue | no |

TABLE 32-continued

| Example | Color after Immersion for 80 sec | Color after Immersion for 300 sec | Test Strip Integrity | Color from Test Strip Leached into 0.575 wt. % OPA Bath |
|---|---|---|---|---|
| 106 | clear to very pale yellow | bright yellow | no issue | no |
| 107 | clear to very pale yellow | bright yellow | no issue | no |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A composition comprising a compound preparable by reaction of components comprising a polyethylenimine and at least one an amine-reactive hydrolyzable organosilane represented by the formula:

R—Z—SiY$_3$ wherein:
R represents an amine-reactive group containing 1 to 18 carbon atoms;
Z represents a divalent organic group containing 1 to 8 carbon atoms; and
each Y independently represents a hydrolyzable group; and
wherein the composition further comprises a polymeric binder material selected from the group consisting of polyvinyl alcohol, hydroxyethyl cellulose, and polymer latexes.

2. The composition of claim 1, further comprising an aqueous liquid vehicle in which the compound is dispersed or dissolved.

3. The composition of claim 1, wherein R has from 1 to 3 carbon atoms.

4. The composition of claim 1, wherein R is selected from the group consisting of an isocyanato group, an oxiranyl group, a glycidoxy group, an acryloxy group, a carboethoxy group, a carbomethoxy group, a vinylsulfonyl group, and an acrylamido group.

5. The composition of claim 1, wherein Z further contains from 1 to 6 heteroatoms selected from the group consisting of O, N, and S.

6. The composition of claim 1, wherein Z comprises an alkylene group containing 1 to 3 carbon atoms.

7. The composition of claim 1, wherein each Y is independently selected from methoxy, ethoxy, hydroxy, acetoxy, chlorine, and bromine.

8. The composition of claim 1, wherein the at least one an amine-reactive hydrolyzable organosilane is selected from the group consisting of 3-isocyanatopropyltriethoxysilane, 3-isocyanatopropyltrimethoxysilane, 2-isocyanatoethyltriethoxysilane, 2-isocyanatoethyltrimethoxysilane, 3-acryloxypropyltriethoxysilane, 3-acryloxypropyltrimethoxysilane, 2-acryloxyethyltriethoxysilane, 2-acryloxyethyltrimethoxysilane, 2,3-epoxypropyltrimethoxysilane, 2,3-epoxypropyltriethoxysilane, 3-glycidoxypropyltriethoxysilane, and 3-glycidoxypropyltrimethoxysilane.

* * * * *